(12) United States Patent
Haubner et al.

(10) Patent No.: US 9,208,752 B2
(45) Date of Patent: Dec. 8, 2015

(54) METHOD FOR SYNCHRONOUS REPRESENTATION OF A VIRTUAL REALITY IN A DISTRIBUTED SIMULATION SYSTEM

(71) Applicant: KRAUSS-MAFFEI WEGMANN GMBH & CO. KG, Munich (DE)

(72) Inventors: Michael Haubner, Munich (DE); Manuel Pabst, Munich (DE)

(73) Assignee: KRAUSS-MAFFEI WEGMANN GMBH & CO. KG, Munich (DE)

( * ) Notice: Subject to any disclaimer, the term of this patent is extended or adjusted under 35 U.S.C. 154(b) by 0 days.

(21) Appl. No.: 14/390,446

(22) PCT Filed: Apr. 3, 2013

(86) PCT No.: PCT/DE2013/100119
§ 371 (c)(1),
(2) Date: Oct. 3, 2014

(87) PCT Pub. No.: WO2013/149616
PCT Pub. Date: Oct. 10, 2013

(65) Prior Publication Data
US 2015/0054714 A1    Feb. 26, 2015

(30) Foreign Application Priority Data
Apr. 5, 2012    (DE) .......................... 10 2012 103 011

(51) Int. Cl.
*G09G 5/12*    (2006.01)
*G09B 9/00*    (2006.01)
(Continued)

(52) U.S. Cl.
CPC *G09G 5/12* (2013.01); *G06T 17/20* (2013.01); *G09B 9/00* (2013.01); *G09B 29/003* (2013.01); *G09B 29/12* (2013.01); *G09G 2300/026* (2013.01); *G09G 2370/02* (2013.01)

(58) Field of Classification Search
CPC .......... G01V 3/38; G06T 17/20; G06T 15/30; G06T 1/00
See application file for complete search history.

(56) References Cited

U.S. PATENT DOCUMENTS

2005/0264566 A1    12/2005  Sommers
2007/0067106 A1*    3/2007  Antoine ............................ 702/5

FOREIGN PATENT DOCUMENTS

EP    1764744    3/2007

OTHER PUBLICATIONS

"Terrain rendering," article from on-line encyclopedia Wikipedia (Sep. 21, 2011).

(Continued)

*Primary Examiner* — Michael Faragalla
(74) *Attorney, Agent, or Firm* — Thompson Hine LLP

(57) ABSTRACT

A method for synchronous representation of a virtual reality terrain in the form of polygons on a plurality of display devices by a plurality of connected simulation computers, may include generating position data specifying which region of the terrain was changed by a first computer; generating elevation data of the changed region by the computer; communicating position and elevation data the first computer to a second computer; selecting, on the basis of the position data, those polygons of the terrain which lie in the changed region by a control unit of the second computer; subdividing the selected polygons in each case into a plurality of sub-polygons by a tessellator unit of the second computer; calculating spatial coordinates of the sub-polygons in accordance with the elevation data by the second computer; and displaying the sub-polygons on a display device connected to the second computer.

14 Claims, 2 Drawing Sheets

(51) Int. Cl.
G09B 29/00 (2006.01)
G09B 29/12 (2006.01)
G06T 17/20 (2006.01)

(56) References Cited

OTHER PUBLICATIONS

Aquilio, A.S., "A Framework for Dynamic Terrain with Application in Off-road Ground Vehicle Simulations," Computer Science Dissertations, Georgia State University, Department of Computer Science (Dec. 4, 2006).

Atlan, s. et al., "Interactive Multiresolution Editing and Display of Large Terrains," Computer Graphics Forum, The Authors, Journal Compilation, The Eurographics Association and Blackwell Publishing Ltd., vol. 25, No. 2, pp. 211-223 (2006).

Batista, H. et al., "Games of War and Peace: Large Scale Simulation Over the Internet," Proceedings of the Seventh International Conference on Virtual Systems and Multimedia (VSMM'01), IEEE (2001).

Cai, X. et al., "Dynamic Terrain Visualization Method using Strip Masks and Its Applications," Computational Intelligence and Security, International Conference, IEEE, vol. 2, pp. 1653-1658 (Nov. 2006).

Campbell, L. et al., "The Use of Artificial Intelligence in Military Simulations," Systems, Man, and Cybernetics, Computational Cybernetics and Simulation, IEEE International Conference, vol. 3, pp. 2607-2612 (Oct. 1997).

Deb, S. et al., "Real-time Streaming and Rendering of Terrains," ICVGIP, LNCS 4338, pp. 276-288 (2006).

Hittner, B.E., "THESIS: Rendering Large-Scale Terrain Models in 3D and Positioning Objects in Relation to 3D Terrain," Naval Postgraduate School, Monterey, California (Dec. 2003).

Schneider, J. et al., "GPU-Friendly High-Quality Terrain Rendering," Journal of WSCG, vol. 14, pp. 49-56 (2006).

Van Den Hurk, S. et al., "Real-Time Terrain Rendering With Incremental Loading for Interactive Terrain Modelling," Proceedings of the International Conference on Computer Graphics Theory and Applications (Mar. 2011).

* cited by examiner

METHOD FOR SYNCHRONOUS REPRESENTATION OF A VIRTUAL REALITY IN A DISTRIBUTED SIMULATION SYSTEM

TECHNICAL FIELD

The disclosure relates to a method for synchronous representation of a virtual reality terrain formed from polygons on a plurality of display devices of a simulation system, which has a plurality of simulation computers connected to one another via a network, wherein spatial coordinates of the polygons of the terrain are stored in each simulation computer and wherein a first simulation computer generates a change of the terrain.

BACKGROUND

The disclosed method can find application in a networked simulation system having a plurality of simulation computers connected to one another via a network. Such simulation systems typically use the Distributed Interactive Simulation (DIS) standard IEEE1278 for distributing the data between the individual simulation computers. Such simulation devices are used for training the crew of land vehicles, such as construction machines or military vehicles, for example.

The networked simulation system has a plurality of display devices on which a shared virtual reality can be represented. Usually, one display device is allocated to each simulation computer. However, it is also possible for a plurality of display devices to be allocated to one simulation computer, in order to represent different views of the virtual reality, for example a view from a vehicle toward the front and a view toward the rear. Furthermore, it may be necessary to represent different views of the shared virtual reality if the simulation device is used by a plurality of simulation participants, as is the case in the parallel training of a plurality of crew members. Furthermore, it is possible to provide a plurality of display devices in which the same view is represented, e.g., in order to give a trainer the opportunity to track the virtual reality from the point of view of a simulation participant.

The virtual reality that can be perceived by the simulation participants on the display devices has a terrain formed by a multiplicity of polygons. In order that each simulation computer can carry out the calculations required for displaying the polygons on the display device, spatial coordinates of the polygons are kept in each simulation computer. For this purpose, the spatial coordinates can be transmitted via the network from another simulation computer or a server and can be stored on the respective simulation computer. In order to make the representation of the terrain appear more realistic, textures representing the surface of the terrain can additionally be mapped onto the polygons.

Changes of the terrain can be generated in the context of the simulations. By way of example, simulated land vehicles can leave tracks in the terrain. A construction machine or a military engineering vehicle can change the terrain by means of excavation work. In the field of military applications, the terrain can furthermore be changed by explosions or impacts of projectiles. The terrain change can firstly relate to the topology of the terrain, that is to say the arrangement of the polygons in the virtual reality. In addition, the texture mapped onto the polygons can also be changed in order to represent changes in the constitution of the terrain.

In the context of a networked simulation it is necessary, then, for the terrain changes calculated by a first simulation computer to be communicated to the other simulation computers, in order that the latter can represent the changes of the terrain on the display devices assigned to them. In the case of known simulation devices, for this purpose, on the first simulation computer, polygons of the changed region are subdivided into sub-polygons and the spatial coordinates thereof are calculated. The spatial coordinates are then transmitted via the network to the other simulation computers. On the basis of the spatial coordinates, the other simulation computers calculate a view of the virtual reality and display the latter on the corresponding display device. In order to be able to achieve a display of the change processes in real time, at least 60 frames per second have to be represented in each of the display devices. The method described above has the disadvantage here that the volume of spatial coordinate and polygon data to be transmitted is so large that there is no guarantee that the data can be transmitted via the network in the transmission time required for a real-time representation.

SUMMARY

Against this background, the disclosed method addresses the problem of reducing the transmission time for transmitting the data via the network.

In the case of a method of the type described, the problem is solved by means of the following method steps:
  the first simulation computer generates position data specifying which region of the terrain was changed,
  the first simulation computer generates elevation data of the changed region of the terrain,
  the first simulation computer communicates the position data and the elevation data via the network to a second simulation computer,
  a control unit of the second simulation computer selects, on the basis of the position data, those polygons of the terrain which lie in the changed region,
  a tessellator unit of the second simulation computer subdivides the selected polygons in each case into a plurality of sub-polygons,
  a calculation unit of the second simulation computer calculates spatial coordinates of the sub-polygons in accordance with the elevation data,
  the sub-polygons are displayed on a display device connected to the second simulation computer.

In the case of the disclosed method, it is not necessary to transmit spatial coordinates of the polygons or of the sub-polygons to the second simulation computer. Instead of spatial coordinates, position data are transmitted which define that region of the terrain which is intended to be changed when displayed in one of the display devices. Moreover, elevation data are transmitted for that region of the terrain which is identified by the position data, the elevation data indicating the extent to which the terrain at a point of the region is intended to be changed relative to the spatial coordinates stored in the second simulation computer. By virtue of the position data and the elevation data, the volume of data that arises is significantly smaller than would be the case when transmitting spatial coordinate data. Consequently, the transmission time via the network can be considerably reduced and the representation of the terrain changes in real time can be made possible.

The spatial coordinates stored in the second simulation computer do not have to be replaced or supplemented by transmitted spatial coordinates. According to the invention, the spatial coordinates stored in the second simulation computer are changed during the calculation of the pixels to be displayed in the display device on the basis of the position data and the elevation data. The calculation of the pixels is carried out, inter alia, in the control unit, the tessellator unit and the calculation unit of the second simulation computer.

In accordance with one configuration of the method, the position data and the elevation data are transmitted in parallel to a plurality of simulation computers, as a result of which the network loading can be reduced. The data can be disseminated by multicast or broadcast transmission in the network. In this case, the data are sent only once to a multiplicity of receivers, which can result in a low network loading. The data are preferably sent as universal datagram protocol (UDP) packets via the network.

A display device can be assigned to each simulation computer of the simulation system, and the terrain of the virtual reality is displayed to a simulation participant on the display device. In principle, the same view of the terrain can be displayed on the display devices of the simulation computers, in particular of the first and second simulation computers. Preferably, however, different views of the terrain are displayed on the display devices, such that a plurality of simulation participants can occupy different locations in the virtual reality. In this case, the same position data and the same elevation data can be communicated to different simulation computers, which calculate different views on the basis of these data and display them on the display devices assigned to them.

With regard to the transmission of the position data, it has proved to be advantageous if the position data are stored in a texture. This affords the advantage that the data to be transmitted via the network are reduced. The texture can be embodied in the manner of a terrain map having elements which respectively correspond to a predefined partial region of the terrain. The partial region can have a size of 10 m×10 m in the virtual reality. For each partial region of the terrain, a digital value indicating whether the corresponding partial region was changed or is unchanged can be stored in the texture. The changed region of the terrain can be defined by the elements which correspond to the changed partial regions.

It is furthermore preferred if the elevation data are stored in a texture. A reduction of the data to be transmitted can likewise be achieved by means of this measure. The texture of the elevation data can be structured in the manner of an elevation map having elements which correspond to a predefined partial region of the changed terrain region defined by the position data. For each partial region, a value corresponding to the change of the elevation at the relevant location of the terrain can be stored in the texture of the elevation data.

In this connection, it has proved to be advantageous if the texture of the elevation data has a higher resolution than the texture of the position data. In this case, it is only for the changed region of the terrain that elevation data are generated with a high degree of detail and transmitted, with the result that the volume of data to be transmitted decreases. It is not necessary to transmit high-resolution elevation data for that region of the terrain which was not changed. An element of the texture of the elevation data can correspond to a partial region having an edge length of up to 10 cm, preferably of up to 5 cm, particularly preferably of up to 2 cm.

Preferably, the elevation data are communicated as a quadtree via the network. The elevation data can be stored efficiently in a quadtree. Particularly in the case of elevation data present as a texture, the volume of data to be transmitted can be reduced since regions of the texture having the same content can be combined to form a leaf of the quadtree. During the transmission of the data via the network, the number of quadtree layers to be transmitted can be chosen in such a way that the volume of data is adapted to the available bandwidth of the network. Consequently, the volume of data can be controlled via the depth of the quadtree.

Furthermore, it has proved to be advantageous if the control unit, the tessellator unit and/or the calculation unit are part of a graphics card of the simulation computer. Arranging the control unit, the tessellator unit and/or the calculation unit on a graphics card makes it possible to relieve the burden on a central processing unit (CPU) of the second simulation computer. It is not necessary to carry out the selection of the polygons, the subdivision into sub-polygons and the calculation of the spatial coordinates of the sub-polygons in the central processing unit. The representation of the terrain on the display device of the second simulation computer can be accelerated as a result. It is particularly advantageous if the control unit, the tessellator unit and/or the calculation unit are part of a graphics processing unit (GPU). The integration of the abovementioned units in a graphics processing unit enables the computing power of the units to be increased further. Preferably, the control unit, the tessellator unit and/or the calculation unit are embodied in a programmable fashion, such that they are adaptable to requirements of the simulation device.

Advantageous configurations of the invention which concern the abovementioned units of the second simulation computer will be presented below.

It is preferred if the control unit checks, for each polygon to be presented, whether the polygon lies in a changed region of the terrain, such that the polygons must be subdivided exclusively in the changed region of the terrain. The amount of calculations required for displaying the terrain on the display device of the second simulation computer can be reduced as a result. No changes to the polygons need be made in the region which is identified as unchanged on the basis of the position data.

In accordance with a further preferred configuration, the resolution of the elevation data is determined and the tessellator unit subdivides the polygons into sub-polygons in accordance with the resolution of the elevation data. This affords the advantage that the subdivision of the polygons into sub-polygons can be controlled via the choice of the resolution of the elevation data. The first simulation computer can thus influence the representation of the terrain on the second simulation computer via the choice of resolution. The calculations required for subdividing the polygons can be carried out after the transmission of the elevation data via the network in the tessellator unit of the second simulation computer.

Furthermore, it is advantageous if the calculation unit calculates the spatial coordinates of the sub-polygons in accordance with an elevation offset stored in the elevation data, such that it is not necessary to transmit the vertices from the first simulation computer to the second simulation computer via the network. Rather, it suffices to transmit only the elevation offset, such that the volume of data to be transmitted can be reduced.

The volume of data required for the transmission of the changes of the polygons via the network can be greatly reduced by the disclosed system. An improved transmission of the data crucial for a wire frame representation of the terrain can thus be made possible. In order to make the representation of the terrain on the display device appear more realistic, the polygons can be covered by textures representing the surface of the terrain. Such a texture and/or an allocation of such a texture to a polygon can also be changed by the first simulation computer.

In this connection it has proved to be advantageous if the first simulation computer generates terrain type data of the changed region of the terrain, which are communicated to the second simulation computer for representing the surface of the changed region on the second simulation computer. On the basis of the transmission of a terrain type, the polygons can be covered by a texture upon being displayed on the display device.

In this case, it is preferred if the terrain type data have entries which respectively form a reference to a texture, in particular a background texture. The volume of data can be greatly reduced on account of the transmitted references. It is not necessary to transmit a dedicated texture for each polygon. The terrain type data can be structured in the manner of an index texture which contains references to textures instead of image data.

A further improvement of the disclosed method can be obtained by means of a configuration in which, for displaying a pixel on the display device, a pixel shader of the second simulation computer selects a background texture on the basis of the terrain type data and calculates a color of the pixel. The reference to a background texture can be evaluated in the pixel shader and, on the basis of the reference, a background texture can be selected which is placed onto the respective polygon during display on the display device. Consequently, only a small volume of data need be transmitted for controlling the display on the display device of the second simulation computer.

Furthermore, it is preferred if the second simulation computer, on the basis of the terrain type data, represents ground vegetation corresponding to the respective terrain type on the display device. In this case, the calculations for representing the ground vegetation can be carried out on the second simulation computer, in particular on a graphics card. It is therefore not necessary to transmit via the network data which describe the shape of the ground vegetation. By means of the reference to a texture that is contained in the terrain type data, ground vegetation corresponding to the texture can be selected and calculated.

BRIEF DESCRIPTION OF THE DRAWINGS

Further details and advantages of the invention will be described below on the basis of an exemplary embodiment illustrated in the drawings, in which.

DETAILED DESCRIPTION

Figure 1:
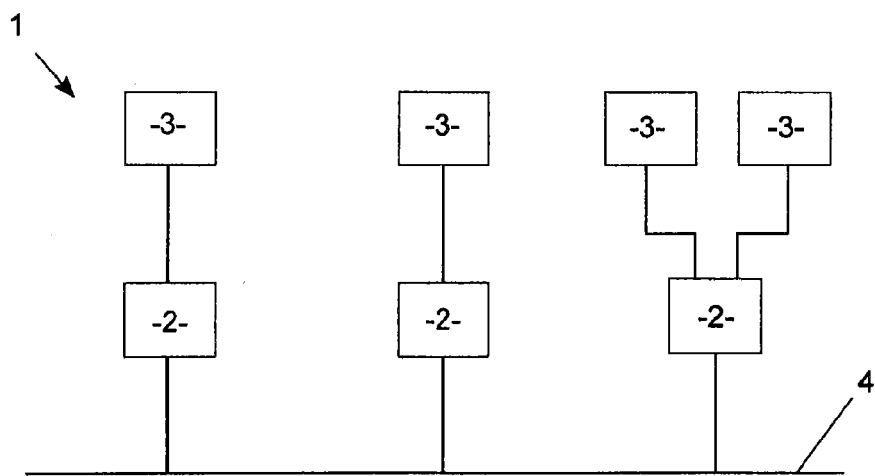
FIG. 1 shows a block diagram of a simulation system embodying the disclosed method.

FIG. 1 illustrates a networked simulation system 1, which has a plurality of simulation computers 2 connected to one another via a network 4 embodied as a local area network (LAN), or wide area network (WAN). The distributed interactive simulation (DIS) standard IEEE1278 is used for data exchange between the individual simulation computers 2. At least one display device 3 on which a virtual reality generated by the networked simulation system 1 can be displayed is connected to each simulation computer 2. Such display devices 3 may take the form of a monitor, flat screen, projector or head-mounted display.

Some simulation computers 2 are connected only to one display device 3. In accordance with the illustration in FIG. 1, however, one of the simulation computers 2 is connected to a plurality of display devices 3 in order to present different views of the virtual reality, for example a view from a vehicle toward the front and a view toward the rear.

In the sphere of civil matters, the simulation system 1 can find application for example for training drivers of wheel- or chain-driven land vehicles, such as bulldozers, diggers or other construction machines. In the field of military use, the simulation system 1 can be used to carry out the training of crew members of military vehicles. For this purpose, a simulation computer 2 can be assigned to each crew member who is to be trained. Via operating devices (not illustrated in the figures) of the simulation computer 2, the crew member as simulation participant can influence the course of the simulation and perceive the simulated virtual reality via one or more display devices 3 connected to the respective simulation computer 2.

The virtual reality that can be perceived by the simulation participants on the display devices 3 has a terrain formed by a multiplicity of polygons arranged in the manner of a wire frame. In order that each simulation computer 2 can carry out the calculations required for displaying the polygons on the corresponding display device 3, spatial coordinates of the polygons are kept in each simulation computer 2. For this purpose, the spatial coordinates can be transmitted via the network 4 from another simulation computer 2 or a server (not illustrated in the figure) and can be stored on the respective simulation computer 2. The spatial coordinates stored on the individual simulation computers 2 are identical in order to enable a consistent representation of the terrain on all the display devices 3 connected to the simulation computers 2. In order to make the representation of the terrain appear more realistic, textures representing the surface of the terrain can additionally be mapped onto the polygons. By way of example, predefined regions of the terrain can be covered with a texture that represents grass in order to generate the impression of a meadow landscape.

In connection with the simulation of movements of the land vehicles, changes of the terrain often occur in the course of the simulation, for example if a land vehicle is moved over a compliant terrain surface and the terrain is consequently deformed, e.g., as a result of the formation of tracks. Furthermore, in the context of training, excavation or leveling work can be carried out on the terrain of the virtual reality, e.g., if preparations for the placement of a mobile bridge are intended to be simulated. In military simulations, the terrain can furthermore be changed by explosions or impacts of projectiles.

In the case of all these changes of the terrain it becomes necessary to display the changes, which are generated in one of the simulation computers 2, for example on account of inputs of a simulation participant, not only on the display devices 3 connected to said simulation computer 2, but also on the other display devices 3 of the simulation system 1. In order to enable a realistic simulation in real time, it is necessary in this case to transmit the corresponding data in real time to the other simulation computers 2 via the network 4. For a realistic display of the dynamic change processes, at least 60 frames per second have to be transmitted to each display device 3 and then displayed therein. In order to keep the volume of data small and to enable the transmission in real time, the following method steps are carried out:

the first simulation computer 2 generates position data L specifying which region of the terrain was changed, the first simulation computer 2 generates elevation data H of the changed region of the terrain, the first simulation computer 2 communicates the position data L and the elevation data H via the network 4 to a second simulation computer 2, a control unit 11 of the second simulation computer 2 selects, on the basis of the position data L, those polygons of the terrain which lie in the changed region, a tessellator unit 12 of the second simulation computer 2 subdivides the selected polygons in each case into a plurality of sub-polygons, a calculation unit 13 of the second simulation computer 2 calculates spatial coordinates of the sub-polygons in accordance with the elevation data H, the sub-polygons are displayed on a display device 3 connected to the second simulation computer 2.

On account of this procedure, it is not necessary to calculate changes of the spatial coordinates of the polygons, and/or new spatial coordinates, in particular vertices, of the generated sub-polygons in the first simulation computer 2 and then to transmit them to the second simulation computer 2. Instead of spatial coordinates, low-resolution position data L are generated in the first simulation computer 2 and transmitted to the second simulation computer 2, the data defining that region of the terrain which is intended to be changed when being displayed in one of the display devices 2. Moreover, high-resolution elevation data H are generated and transmitted for that region of the terrain which is identified by the position data L, the elevation data H indicating the extent to which the terrain at a point of the region is intended to be changed. By virtue of the position data L and the elevation data H, the volume of data that arises is significantly smaller than would be the case when transmitting spatial coordinate data of the changed region of the terrain. Consequently, the transmission time via the network 4 can be considerably reduced and a highly dynamic representation of the terrain changes in real time can be made possible.

In accordance with the exemplary embodiment, the data L and H proceeding from the first simulation computer 2 are communicated to all other simulation computers 2 of the simulation device 1 via the network 4, e.g. by means of a multicast or broadcast transmission.

The structure of the position data L and elevation data H transmitted via the network 4 will be explained in greater detail below with reference to the schematic illustration in FIG. 2:

The position data L are present as a two-dimensional data structure in the manner of a texture which corresponds to the entire area of the simulated terrain. The position data L can thus be conceived of as a terrain map indicating the locations at which the terrain has changed in relation to the state stored in the simulation computers 2. The position data L contain binary entries each corresponding to a predefined partial region of the terrain. The partial region can have a size of 10 m×10 m. For each partial region of the terrain, a digital value indicating whether the corresponding partial region was changed or is unchanged can be stored in the texture. The changed region of the terrain can be defined by the elements which correspond to the changed partial regions.

Figure 2:
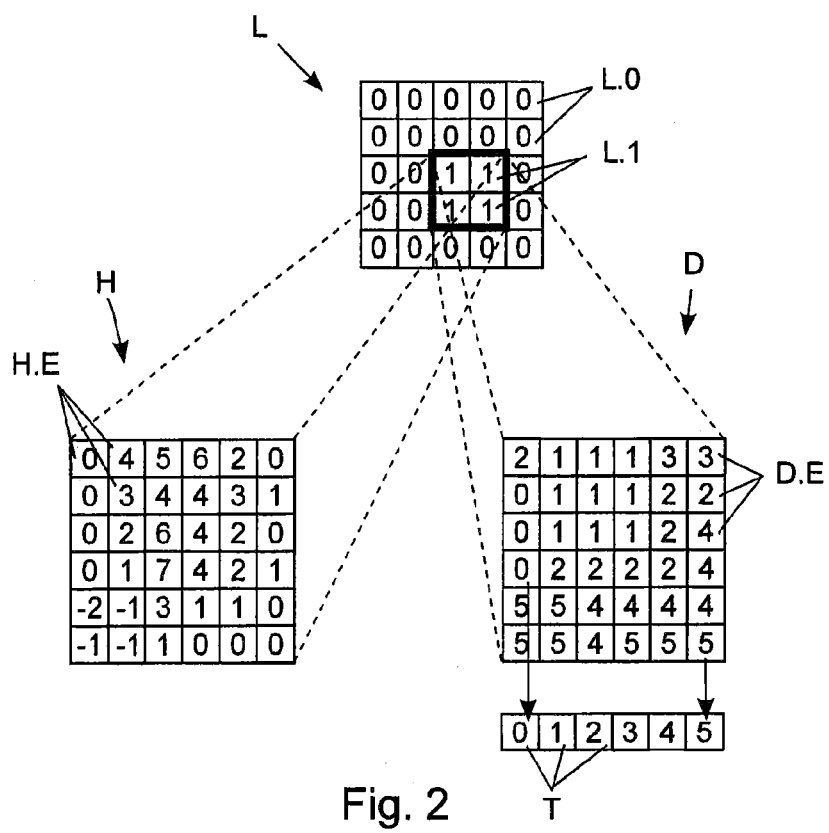
FIG. 2 shows a schematic illustration of the data structures used for transmission in the system of FIG. 1.

In accordance with the example illustrated in FIG. 2, the position data L define, in the center of the terrain, a region which is formed from a total of four partial regions and in which the terrain has changed. The elements L.1 of the position data L corresponding to the partial regions are set to the value "1", whereas the elements L.0 corresponding to partial regions which were not changed are set to the value "0".

For the representation of the changed region of the terrain, in the first simulation computer 2 further data structures H and D are created and transmitted together with the position data L in parallel to the other simulation computers 2 of the simulation device 1. This involves the elevation data H and the terrain type data D, which will now be discussed in greater detail.

The elevation data H are likewise stored in a texture, as a result of which a reduction of the data to be transmitted can be achieved. The texture of the elevation data H is structured in the manner of an elevation map having elements H.E which correspond to a predefined partial region of the changed terrain region defined by the position data L. For each partial region, a numerical value—an elevation offset—corresponding to the change of the elevation at the relevant location of the terrain is stored in the texture of the elevation data H. The texture of the elevation data H has a higher resolution than the texture of the position data L. Since it is exclusively for the changed region of the terrain that elevation data H are generated with a high degree of detail and transmitted, the volume of data to be transmitted can be kept small. It is not necessary to transmit high-resolution elevation data H for that region of the terrain which was not changed. An element H.E of the elevation data H can correspond to a partial region of the terrain having an edge length of up to 10 cm, preferably of up to 5 cm, particularly preferably of up to 2 cm.

The data structure of the terrain type data D is likewise embodied as a texture and has the same resolution as the texture of the elevation data H. Consequently, each element D.E of the terrain type data D can be assigned an element H.E of the elevation data which corresponds to the same partial region of the changed terrain of the virtual reality. The first simulation computer 2 generates terrain type data D of the changed region of the terrain, which are communicated to the second simulation computer 2 for the purpose of representing the surface of the changed region on the second simulation computer 2. On the basis of the transmission of a terrain type, the polygons, when displayed on the display device 3 connected to the second simulation computer 2, can be occupied by a background texture corresponding to the respective terrain type. The elements D.E are in each case references to a background texture T. The background texture T can be stored in the respective simulation computer 2 that receives the data D, or can be transmitted together with the position data L, the elevation data D and/or the terrain type data D. This results in a data structure in the manner of a an index texture which contains, instead of image data, references to background textures T. Such background textures can represent, for example, grass, water, undergrowth, forest floor or desert floor.

Optionally, the second simulation computer 2 can represent on the display device 3, on the basis of the terrain type data D, ground vegetation corresponding to the respective terrain type, e.g. blades of grass or bushes. In this case, the calculations for representing the ground vegetation can be carried out in the second simulation computer 2. Therefore, it is not necessary to transmit via the network 4 data which describe the shape of the ground vegetation. Via the reference D.E to a background texture T that is contained in the terrain type data D, ground vegetation corresponding to the background texture T can be selected and calculated in the second simulation computer 2 that receives the terrain type data.

The elevation data H and the terrain type data D are communicated as a quadtree via the network 4. The corresponding data H, D can be stored efficiently as a result. The volume of data to be transmitted can be reduced by regions of the texture H, D with the same content being combined to form a leaf of the quadtree. During the transmission of the data H, D via the network 4, the number of quadtree layers to be transmitted is chosen here by the simulation computer 2 that sends the data H, D in such a way that the volume of data contained in the quadtree is adapted to the available bandwidth of the network 4. Consequently, the volume of data to be transmitted can be controlled by means of the choice of the depth of the quadtree.

Figure 3:
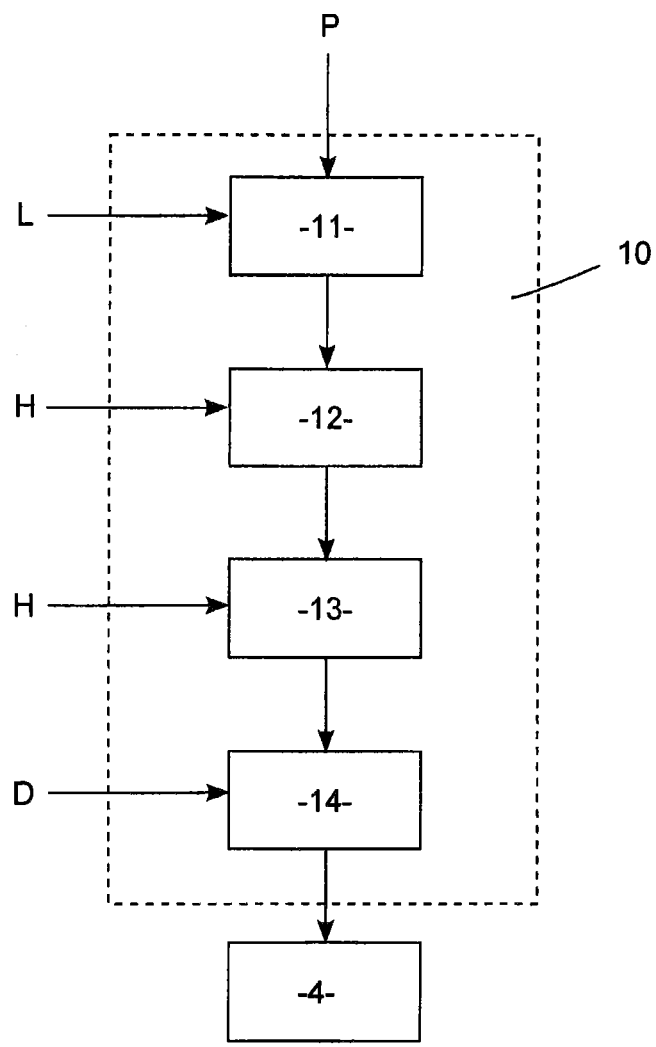
FIG. 3 shows a block diagram of part of a simulation computer of the system of FIG. 1.

With reference to the illustration in FIG. 3, an explanation will be given below of how the position data L, elevation data H and terrain type data D that are transmitted via the network 4 are used during the calculation of the representation of the terrain on the part of the second simulation computer 2 that receives the data L, H, D. Each simulation computer 2 has a graphics card having a graphics processing unit (GPU) 10, to which are fed the communicated position data L, elevation data H and terrain type data D for the calculation of the display in the display device 3 connected to the simulation computer 2. The control unit 11, the tessellator unit 12 and the calculation unit 13 are part of a processing chain of the graphics processing unit 10. They are embodied in a programmable fashion, such that they can be adapted to the requirements of the simulation device 1.

For the calculation of the individual pixels which are intended to be represented on the display device 3, polygon data P, in particular spatial coordinates, of the individual polygons of the terrain are fed to the graphics processing unit 10 from a memory of the second simulation computer 2. Within the GPU 10, these polygon data P firstly pass through the control unit 11, which checks, for each polygon to be represented, whether said polygon lies in a changed region of the terrain. The position data L are used for this purpose. By means of a comparison with the position data L, the control unit can ascertain whether the polygon to be checked is part of a changed terrain region.

In a subsequent process element of the processing chain, the tessellator unit 12, such polygons which the control unit 11 identified as lying in the changed terrain region are then processed further. Firstly, the resolution of the elevation data H is determined. In the tessellator unit 12, the identified polygons are subdivided into sub-polygons in accordance with the resolution of the elevation data H, such that the changed terrain region can be represented in a more detailed manner on the display device 3. For this purpose, the elevation data H are fed to the tessellator unit 12.

In the calculation unit 13, which is arranged as the next process element of the processing chain of the GPU 10, spatial coordinates, in particular vertices, of the sub-polygons generated in the tessellator unit 12 are calculated in accordance with the elevation offset stored in the elevation data H. For this purpose, the calculation unit 13 has access to the elevation data H.

After the individual polygons and sub-polygons of the terrain have been calculated in the units 11, 12 and 13, the polygon data P are fed to a pixel shader 14, in which the color values of the individual pixels of the display device 3 are calculated. The terrain type data D are additionally fed to said pixel shader 14. On the basis of the terrain type data D, the pixel shader 14 selects a background texture and calculates for each pixel a corresponding color value, which is subsequently represented on the display device 4.

The above-described method for synchronous representation of a terrain of a virtual reality formed from polygons makes it possible to reduce the transmission time for transmitting the data via the network 4 of the simulation system 1. As a result, dynamic terrain changes can be displayed in real time on all the display devices 3. A high representation speed can be achieved on account of efficient communication and synchronization via the network 4. The performance of central processing units and graphics processing units 10 of the simulation computers 2 can be utilized optimally and in parallel. Furthermore, the method is distinguished by the fact that a high resolution can be represented in the display devices and realistic textures and texture transitions can be used.

Even though a description has been given above of the processes involved in the calculation of the representation of the terrain on the display device 3 which is associated with the simulation computer 2 that receives the position data L, elevation data H and terrain type data D, these method steps can likewise be carried out on the part of the simulation computer 2 that calculates the data L, H and D and communicates them to the other simulation computers 2.

REFERENCE SIGNS

1 Simulation device
2 Simulation computer
3 Display device
4 Network
10 Graphics processing unit
11 Control unit
12 Tessellator unit
13 Calculation unit
14 Pixel shader
D Terrain type data
D.E Element
H Elevation data
H.E Element
L Position data
L.0 Element
L.1 Element
P Polygon data

What is claimed is:

1. A method for synchronous representation of a terrain—formed from polygons—of a virtual reality on a plurality of display devices of a simulation device, which has a plurality of simulation computers connected to one another via a network, wherein spatial coordinates of the polygons of the terrain are stored in each simulation computer and wherein a first simulation computer generates a change of the terrain, the method comprising:
   generating position data specifying which region of the terrain was changed by a first one of the plurality of simulation computers;
   generating elevation data of the changed region of the terrain by the first one of the plurality of simulation computers;
   communicating the position data and the elevation data via the network by the first one of the plurality of simulation computers to a second one of the plurality of simulation computers;
   selecting, on the basis of the position data, those polygons of the terrain which lie in the changed region by a control unit of the second one of the plurality of simulation computers;
   subdividing the selected polygons in each case into a plurality of sub-polygons by a tessellator unit of the second one of the plurality of simulation computers;
   calculating spatial coordinates of the sub-polygons in accordance with the elevation data by a calculation unit of the second one of the plurality of simulation computers; and
   displaying the sub-polygons on a display device connected to the second one of the plurality of simulation computers.

2. The method of claim 1, further comprising transmitting the position data and the elevation data in parallel to a plurality of simulation computers.

3. The method of claim 2, further comprising displaying different views of the terrain on display devices assigned to a different one of each one of the plurality of simulation computers.

4. The method of claim 1, further comprising storing the position data and/or the elevation data in a texture.

5. The method of claim 4, wherein the texture of the elevation data has a higher resolution than the texture of the position data.

6. The method of claim 1, wherein the elevation data are communicated as a quadtree via the network.

7. The method of claim 1, wherein the control unit, the tessellator unit, and the calculation unit are part of a graphics card of a graphics processing unit of the second one of the plurality of simulation computers.

8. The method of claim 1, further comprising checking by the control unit for each polygon to be presented on the display device, whether the polygon lies in a changed region of the terrain.

9. The method as claimed in claim 1, further comprising determining the resolution of the elevation data; and subdividing the polygons into sub-polygons in accordance with the resolution of the elevation data by the tessellator unit.

10. The method claimed in claim 1, further comprising calculating by the calculation unit the spatial coordinates of the sub-polygons in accordance with an elevation offset stored in the elevation data.

11. The method of claim 1, further comprising generating by the first one of the plurality of simulation computers terrain-type data of the changed region of the terrain, which are communicated to the second one of the plurality of simulation computers for representing the surface of the changed region on the second one of the plurality of simulation computers.

12. The method of claim 11, wherein the terrain type data have entries which respectively form a reference to a background texture.

13. The method of claim 11, wherein displaying a pixel on the display device includes selecting a background texture on the basis of the terrain-type data by a pixel shader of the second one of the plurality of simulation computers, and calculating a color of the pixel.

14. The method of claim 11, further comprising representing ground vegetation corresponding to the respective terrain type by the second one of the plurality of simulation computers on the display device.

* * * * *